United States Patent
Liu et al.

(10) Patent No.: US 9,985,944 B2
(45) Date of Patent: May 29, 2018

(54) METHOD AND APPARATUS FOR USER AUTHENTICATION

(71) Applicant: Tencent Technology (Shenzhen) Company Limited, Shenzhen (CN)

(72) Inventors: Jinxing Liu, Shenzhen (CN); Yuanhui Xie, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days. days.

(21) Appl. No.: 14/726,358

(22) Filed: May 29, 2015

(65) Prior Publication Data
US 2015/0264031 A1 Sep. 17, 2015

Related U.S. Application Data

(63) Continuation of application No. PCT/CN2013/088859, filed on Dec. 9, 2013.

(30) Foreign Application Priority Data

Jan. 4, 2013 (CN) .......................... 2013 1 0001334

(51) Int. Cl.
*H04L 29/06* (2006.01)
*G06F 21/31* (2013.01)

(52) U.S. Cl.
CPC .............. *H04L 63/08* (2013.01); *G06F 21/31* (2013.01); *H04L 63/108* (2013.01); *H04L 2463/082* (2013.01)

(58) Field of Classification Search
CPC ....... H04L 63/08; H04L 63/108; G06F 21/31; G06F 9/00
See application file for complete search history.

(56) References Cited

U.S. PATENT DOCUMENTS 7,512,407 B2 * 3/2009 Wu .......................... H04L 51/04
455/466
8,910,251 B2 * 12/2014 Shepard .................. G06F 21/31
726/18

(Continued)

FOREIGN PATENT DOCUMENTS

CN 102317903 A 1/2012
CN 102355664 A 2/2012

OTHER PUBLICATIONS

The State Intellectual Property Office of the People's Republic of China (SIPO) Office Action 1 for 201310001334.6 dated Nov. 2, 2017 7 Pages (including translation).

(Continued)

*Primary Examiner* — Wasika Nipa
(74) *Attorney, Agent, or Firm* — Anova Law Group, PLLC (57) ABSTRACT

A method and apparatus for authenticating a user is provided, the method includes: receiving an authentication request sent from a user device by a user; providing basic information in response to the authentication request, wherein the basic information comprises information related to a social networking service used by the user; generating authentication information based on the basic information, wherein the authentication information comprises a question and a corresponding answer; sending the question to the user device and receiving feedback information from the user device; and generating an authentication result by verifying whether the feedback information is consistent with the answer, and sending the authentication result to the user device. The method and apparatus address the issue of forgotten answers to security questions used in user authentication.

16 Claims, 7 Drawing Sheets

(56) References Cited

U.S. PATENT DOCUMENTS

2006/0224968 A1* 10/2006 Urquhart .............. H04L 12/581
                                                                715/741
2008/0148366 A1*  6/2008 Wahl ....................... G06F 21/36
                                                                  726/4
2011/0191838 A1    8/2011 Yanagihara

OTHER PUBLICATIONS

The World Intellectual Property Organization (WIPO) International Search Report for PCT/CN2013/088859 dated Mar. 20, 2014 3 Pages.

* cited by examiner

METHOD AND APPARATUS FOR USER AUTHENTICATION

CROSS-REFERENCE TO RELATED APPLICATIONS

This application is a continuation of International Patent Application No. PCT/CN2013/088859, entitled "Method and Apparatus for User Authentication," filed on Dec. 9, 2013. This application claims the benefit and priority of Chinese Patent Application No. 201310001334.6, entitled "Method and Apparatus for User Authentication," filed on Jan. 4, 2013. The entire disclosures of each of the above applications are incorporated herein by reference.

TECHNICAL FIELD

The present invention relates to computer technologies, and more particularly, to a method and apparatus for user authentication.

BACKGROUND

To authenticate a user, websites or applications typically determine whether a password entered by the user matches with the user account. However, simply relying on user account and password to authenticate users is no longer adequate in many situations.

A number of other technologies have been developed to authenticate users, and using security questions is a common technique.

A typical security question includes a question and an answer. The security questions are often setup by the user, and the correct answer to the security question must be provided to pass the authentication process.

Since security questions are often setup wholly or partially by the user, the user may forget the answer to a security question due to various reasons, and cannot pass the authentication process. As a result, the user may not be able to login to the desired website or application, which may cause significant inconveniences to the user.

Thus, there is a need for a technical solution that addresses the issue of forgotten answers to security questions.

SUMMARY OF THE INVENTION

The embodiments of the present invention provide a method and apparatus for user authentication that address the issue of forgotten answers to security questions.

In accordance with embodiment of the present invention, a method for authenticating a user is provided, the method comprising: receiving an authentication request sent from a user device by a user; providing basic information in response to the authentication request, wherein the basic information comprises information related to a social networking service used by the user; generating authentication information based on the basic information, wherein the authentication information comprises a question and a corresponding answer; sending the question to the user device and receiving feedback information from the user device; and generating an authentication result by verifying whether the feedback information is consistent with the answer, and sending the authentication result to the user device.

In accordance with embodiment of the present invention, an apparatus for authenticating a user is provided, the apparatus comprising: a transmission module configured to receive an authentication request sent from a user device by a user; a basic information provision module configured to provide basic information in response to the authentication request, wherein the basic information comprises information related to a social networking service used by the user; an authentication information generation module configured to generate authentication information based on the basic information, wherein the authentication information comprises a question and a corresponding answer, and the transmission module is configured to send the question to the user device; and an authentication module configured to generate an authentication result by verifying whether a feedback information is consistent with the answer, wherein the transmission module is configured to receive the feedback information from the user device and send the authentication result to the user device.

In accordance with embodiment of the present invention, security question is generated from a user's records of using social networking service, and sent to the user device to authenticate the user. Thus, the user does not need set up the security questions and answers. Since the security question is related to the user's records of using social networking service, the user knows the answer to the security question, and does not need to remember the answer, which addresses the issue of forgetting the answer. In addition, a different security question can be generated for each authentication process, and the security question can be set up to be answered within a certain time period, which ensures the effectiveness of the authentication process and the security of the user account.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings.

Figure 1:
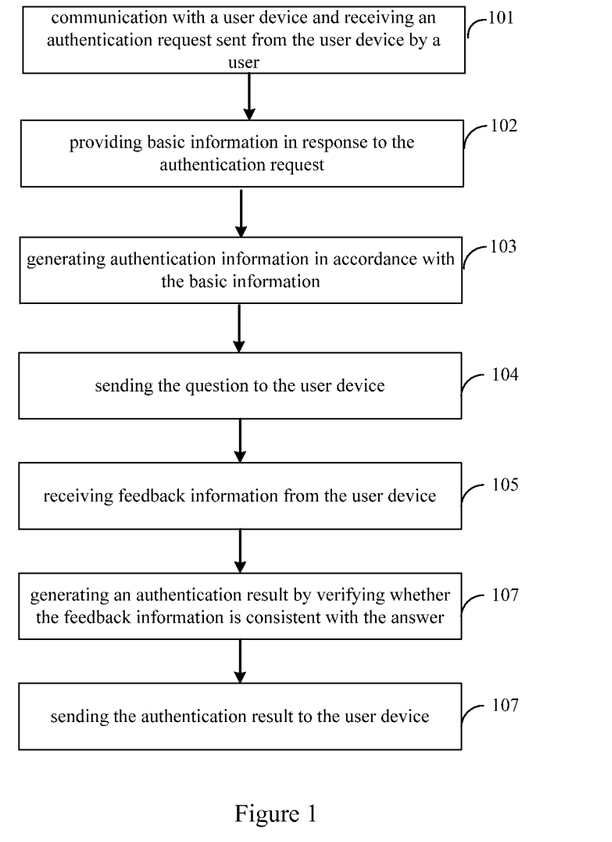
FIG. 1 is an exemplary flowchart for a method for authenticating a user in accordance with an embodiment of the present invention.

FIG. 1 is an exemplary flowchart for a method for authenticating a user in accordance with an embodiment of the present invention. As shown in FIG. 1, the method includes the following steps.

Step 101: receiving an authentication request sent from a user device by a user. The authentication request can be related to the authentication of account in a website or an application, such as email or instance messaging applications.

Step 102: providing basic information in response to the authentication request, wherein the basic information includes information related to a social networking service used by the user. Here, the basic information can include the user's records of using the social networking service, such as comments or pictures posted by the user on Weibo, friends added by the user in the instance messaging application, or private nickname given to friends by the user in a social networking application.

Also, social network service used by the user includes social network service that the user registered with or signs on to; and the basic information can be the registration information of the user.

Step 103: generating authentication information based on the basic information, wherein the authentication information includes a question and a corresponding answer. The authentication information can be generated as following: determining the type of user's records of using the social networking service based on the basic information, such as comments or pictures posted by the user on Weibo, friends added by the user in the instance messaging application, or private nickname given to friends by the user in a social networking application; then generating the corresponding question answer based on the user's records of using the social networking service. For example, the question can be: "Which comment did you recently post on Weibo? A. Comment One; B Comment Two; or C. Comment Three"; "Which picture did you recently post on Weibo? A. Picture One; B Picture Two; or C. Picture Three"; "Which friend did you recently add on the instance messaging application? A. Friend One; B Friend Two; or C. Friend Three"; or "Which nickname did you give to John Smith in QQ? A. Nickname One; B Nickname Two; or C. Nickname Three".

Step 104: sending the question to the user device.

Step 105: after sending the question to the user device, receiving feedback information from the user device.

Step 106: generating an authentication result by verifying whether the feedback information is consistent with the answer.

Step 107: sending the authentication result to the user device.

In accordance with this embodiment, security question is generated from a user's records of using social networking service, and sent to the user device to authenticate the user. Thus, the user does not need set up the security questions and answers. Since the security question is related to the user's records of using social networking service, the user knows the answer to the security question, and does not need to remember the answer, which addresses the issue of forgetting the answer. In addition, a different security question can be generated for each authentication process, and the security question can be set up to be answered within a certain time period, which ensures the effectiveness of the authentication process and the security of the user account.

Figure 2:
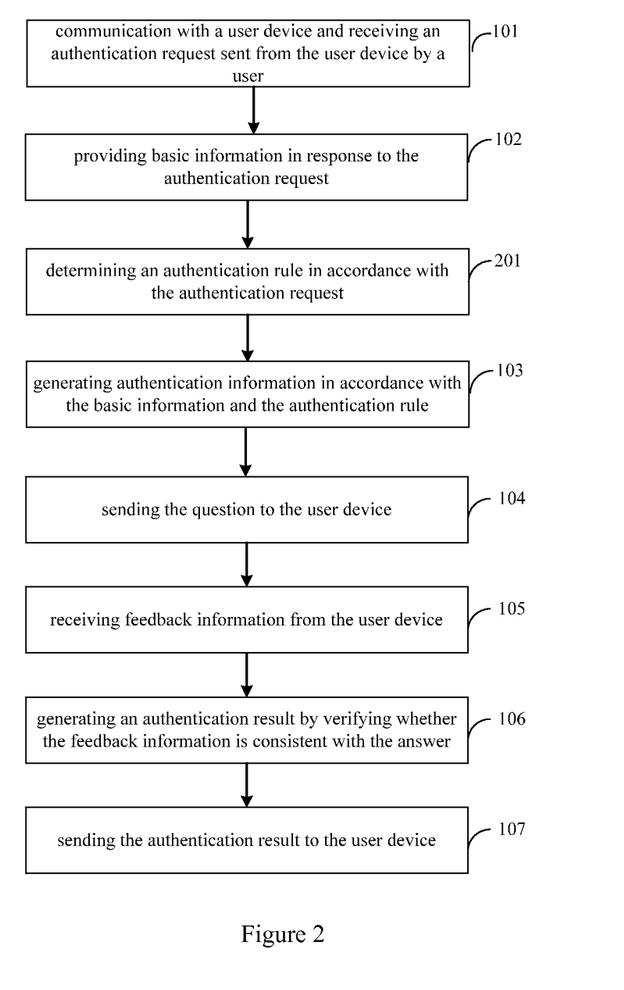
FIG. 2 is an exemplary flowchart for a method for authenticating a user in accordance with another embodiment of the present invention.

FIG. 2 is an exemplary flowchart for a method for authenticating a user in accordance with another embodiment of the present invention. As shown in FIG. 2, the method in this embodiment is similar to the embodiment above in FIG. 1, but includes additional Step 201 prior to Step 103.

Step 201: determining an authentication rule in accordance with the authentication request. The authentication rule can be related to the type of the user's records of using the social networking service. For example, the authentication rule may be configured to select one of the following records: comments posted by the user on Weibo, pictures posted by the user on Weibo, friends added by the user in the instance messaging application, or private nickname given to friends by the user in a social networking application.

In Step 201, the authentication rule is selected from a set of authentication rules. The set may contain different authentication rules.

Step 103: generating authentication information in accordance with the authentication rule. Specifically, a type of records (e.g., comments posted by the user on Weibo) can be selected in accordance with the authentication rule.

Figure 3:
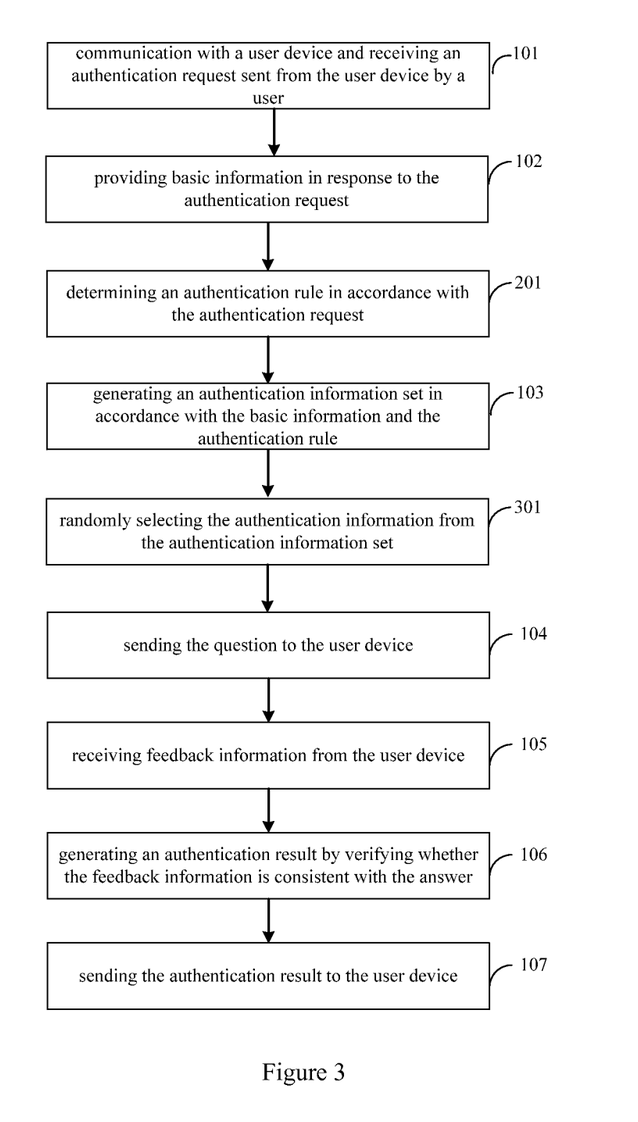
FIG. 3 is an exemplary flowchart for a method for authenticating a user in accordance with yet another embodiment of the present invention.

FIG. 3 is an exemplary flowchart for a method for authenticating a user in accordance with yet another embodiment of the present invention. As shown in FIG. 3, the method in this embodiment is similar to the embodiments above in FIGS. 1 and 2, but includes an additional Step 301 after Step 103.

Step 103: generating an authentication information set in accordance with the basic information and the authentication rule, wherein the authentication information set comprises at least two authentication information items.

Step 301: randomly selecting the authentication information from the authentication information set.

In accordance with this embodiment, at least two authentication information items are generated, and the authentication information is randomly selected, which enhances the arbitrariness of the authentication information so as a different security question can be generated for each authentication process, which ensures the effectiveness of the authentication process and the security of the user account.

Figure 4:
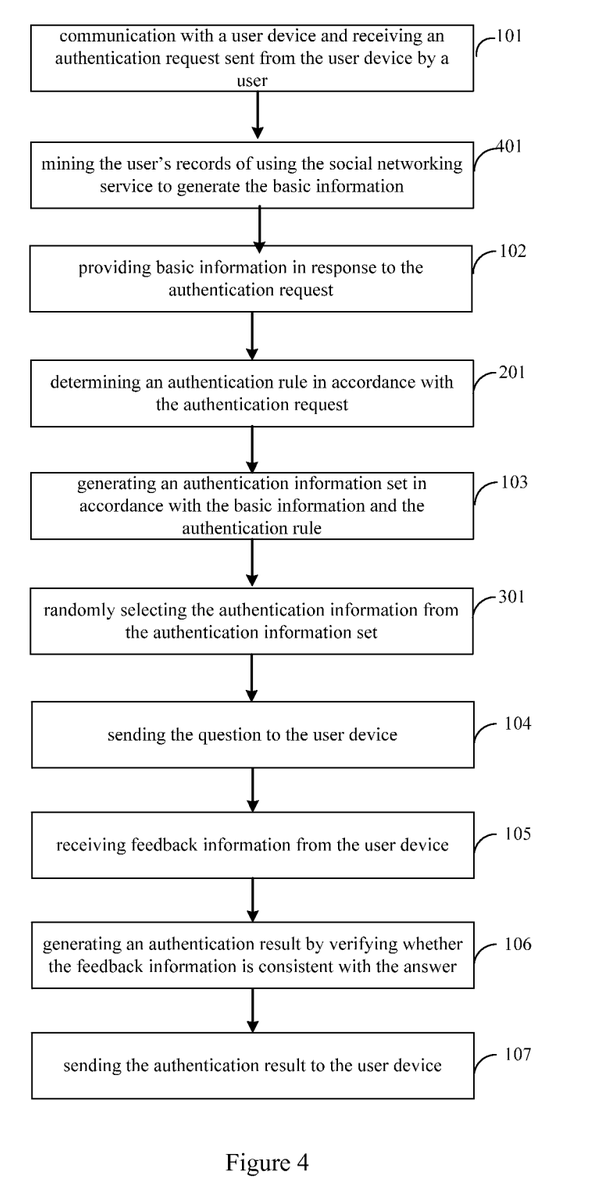
FIG. 4 is an exemplary flowchart for a method for authenticating a user in accordance with yet another embodiment of the present invention.

FIG. 4 is an exemplary flowchart for a method for authenticating a user in accordance with yet another embodiment of the present invention. As shown in FIG. 4, the method in this embodiment is similar to the embodiments above in FIGS. 1, 2, and 3, but includes an additional Step 401.

Step 401: mining the user's records of using the social networking service to generate the basic information. Step 401 can be performed before, after, or in parallel to any step of the method. In other words, data mining can be performed either before or after the authentication process. For example, Step 401 can be performed after Step 101.

In accordance with this embodiment, the user's records of using the social networking service are mined to generate the basic information, which ensures that records of using the social networking service can be promptly provided to authenticate the user as needed.

In another embodiment, the answer and the question can be related to the user's records of using the social networking service.

In another embodiment, the authentication information can include at least two options, and one option corresponds to the answer. The options can be sent to the user device along with the question.

In another embodiment, security question is generated from the user's social networking information that is not shared by the social networking service to any other user, such as private nickname given to friends by the user in a social networking application. Such private social networking information is particular suitable for generating security questions, as the user is likely familiar with such information, while others cannot access such information. Thus, the chance that other users might be able to answer the security question is reduced, and the security of the authentication process is enhanced. For example, in the instance messaging application QQ provided by Tencent Technology, a user can define a private nickname for each of its contact. A security question based on the private nickname in QQ can be as simple as: "Which nickname did you give to John Smith in QQ?"

In another embodiment, the user must answer the security question within a preset time period, such as 60 seconds, to pass the authentication process. For example, if the security question is based on comments posted by the user on Weibo, there is the possibility that another user might be able to conduct research on Weibo to obtain the answer to the security question. However, that user is unlikely to complete the research within a very short time period. Thus, having a time limit in answering the security question can further enhance the security of the authentication process.

Figure 5:
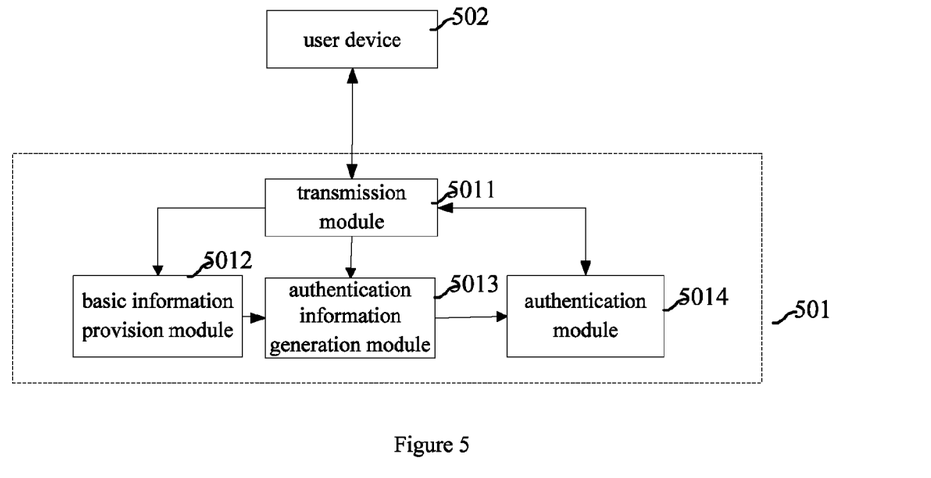
FIG. 5 is an exemplary schematic diagram for an apparatus for authenticating a user in accordance with yet another embodiment of the present invention.

FIG. 5 is an exemplary schematic diagram for an apparatus for authenticating a user in accordance with yet another embodiment of the present invention.

As shown in FIG. 5, the apparatus 501 includes a transmission module 5011, a basic information provision module 5012, an authentication information generation module 5013, and an authentication module 5014.

The transmission module 5011 is configured to receive an authentication request sent from a user device 502 by a user.

The basic information provision module 5012 is configured to provide basic information in response to the authentication request, wherein the basic information includes information related to a social networking service used by the user.

The authentication information generation module 5013 is configured to generate authentication information based on the basic information, wherein the authentication information includes a question and a corresponding answer. The transmission module 5011 is configured to send the question to the user device 502, and the authentication information generation module 5013 is configured to send answer or the authentication information to authentication module 5014.

The authentication module 5014 is configured to generate an authentication result by verifying whether feedback information is consistent with the answer, wherein the transmission module 5011 is configured to receive the feedback information from the user device 502 and send the authentication result to the user device 502.

In accordance with this embodiment, security question is generated from a user's records of using social networking service, and sent to the user device to authenticate the user. Thus, the user does not need set up the security questions and answers. Since the security question is related to the user's records of using social networking service, the user knows the answer to the security question, and does not need to remember the answer, which addresses the issue of forgetting the answer. In addition, a different security question can be generated for each authentication process, and the security question can be set up to be answered within a certain time period, which ensures the effectiveness of the authentication process and the security of the user account.

Figure 6:
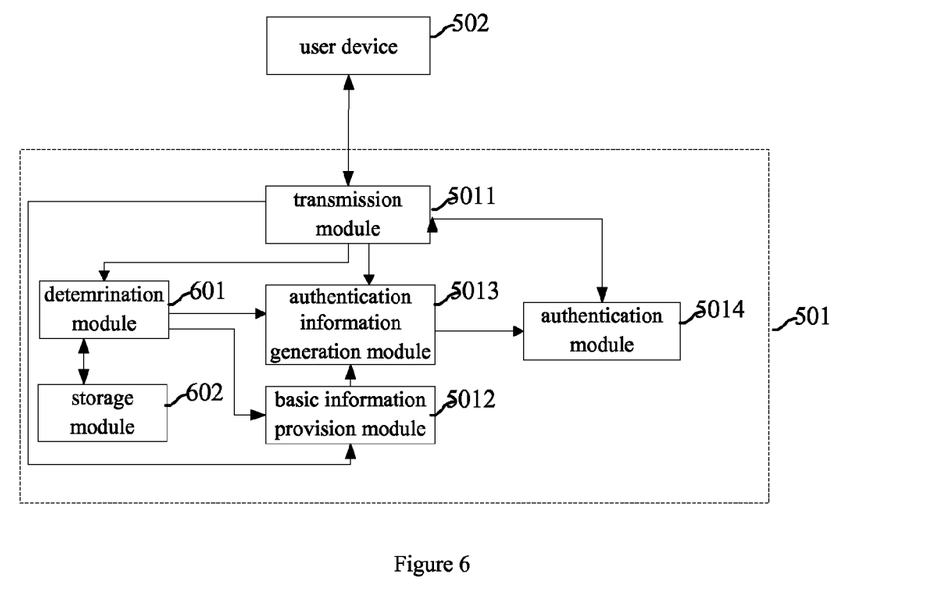
FIG. 6 is an exemplary schematic diagram for an apparatus for authenticating a user in accordance with yet another embodiment of the present invention.

FIG. 6 is an exemplary schematic diagram for an apparatus for authenticating a user in accordance with yet another embodiment of the present invention. As shown in FIG. 6, the apparatus 501 in this embodiment is similar to the embodiment above in FIG. 5, but further includes an authentication rule determination module 601.

The authentication rule determination module 601 is configured to determine an authentication rule in accordance with the authentication request. After the authentication rule is determined, the authentication rule determination module 601 sends that to the authentication information generation module 5013.

The authentication information generation module 5013 is also configured to generate authentication information in accordance with the authentication rule.

In this embodiment, the apparatus 501 also includes a storage module 602.

The storage module 602 is configured to provide a set of authentication rules. The set may contain different authentication rules.

The authentication rule determination module 601 is further configured to select the authentication rule from the set of authentication rules.

Figure 7:
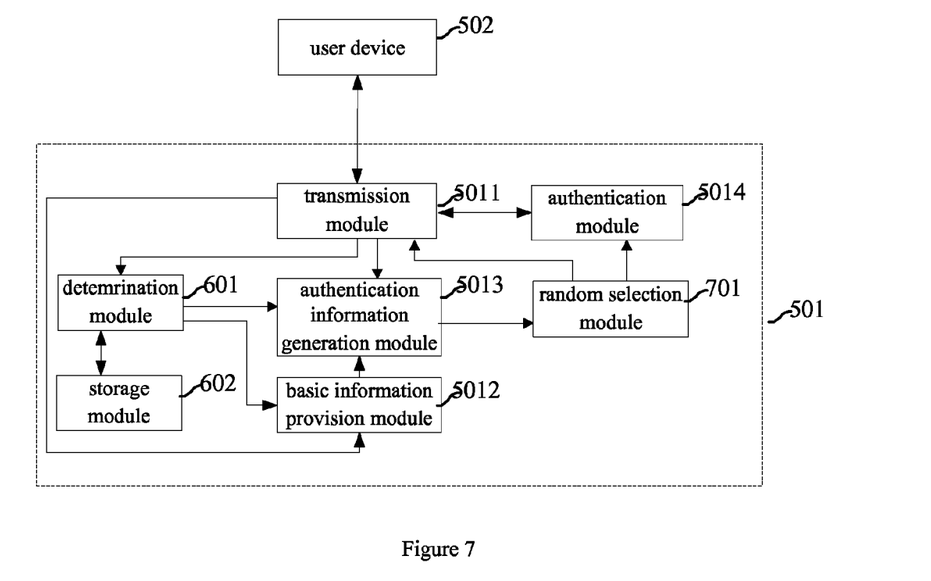
FIG. 7 is an exemplary schematic diagram for an apparatus for authenticating a user in accordance with yet another embodiment of the present invention.

FIG. 7 is an exemplary schematic diagram for an apparatus for authenticating a user in accordance with yet another embodiment of the present invention. As shown in FIG. 7, the apparatus 501 in this embodiment is similar to the embodiment above in FIGS. 5 and 6, but further includes random selection module 701.

The authentication information generation module 5013 is also configured to generate an authentication information set based on the basic information, wherein the authentication information set comprises at least two authentication information items.

The apparatus 501 also includes a random selection module 701.

The random selection module 701 is configured to randomly select the authentication information from the authentication information set.

In accordance with this embodiment, at least two authentication information items are generated, and the authentication information is randomly selected, which enhances the arbitrariness of the authentication information so as a different security question can be generated for each authentication process, which ensures the effectiveness of the authentication process and the security of the user account.

Figure 8:
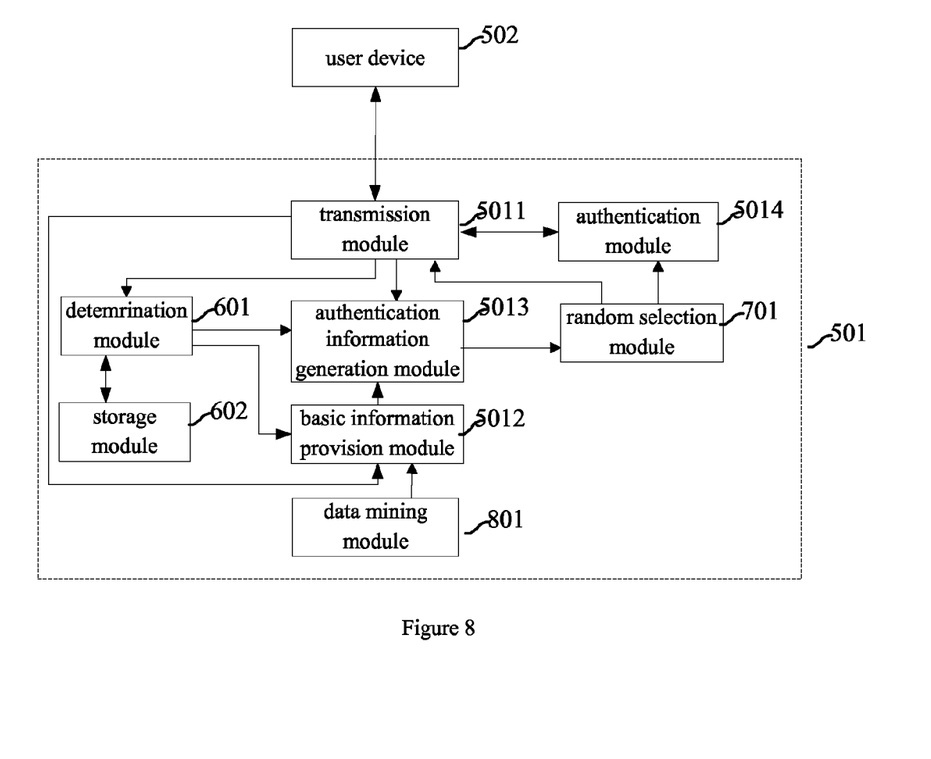
FIG. 8 is an exemplary schematic diagram for an apparatus for authenticating a user in accordance with yet another embodiment of the present invention.

FIG. 8 is an exemplary schematic diagram for an apparatus for authenticating a user in accordance with yet another embodiment of the present invention. As shown in FIG. 8, the apparatus 501 in this embodiment is similar to the embodiment above in FIGS. 5, 6 and 7, but further includes a data mining module 801.

The data mining module 801 is configured to mine the user's records of using the social networking service to generate the basic information. The data mining module 801 can perform data mining either before or after the authentication process.

In accordance with this embodiment, the user's records of using the social networking service are mined to generate the basic information, which ensures that records of using the social networking service can be promptly provided to authenticate the user as needed.

In another embodiment, the answer and the question can be related to the user's records of using the social networking service.

In another embodiment, the authentication information can include at least two options, and one option corresponds to the answer. The options can be sent by the transmission module 5011 5011 to the user device 502 along with the question.

In another embodiment, security question is generated from the user's social networking information that is not shared by the social networking service to any other user, such as private nickname given to friends by the user in a social networking application.

In another embodiment, the user must answer the security question within a preset time period, such as 60 seconds, to pass the authentication process.

Figure 9:
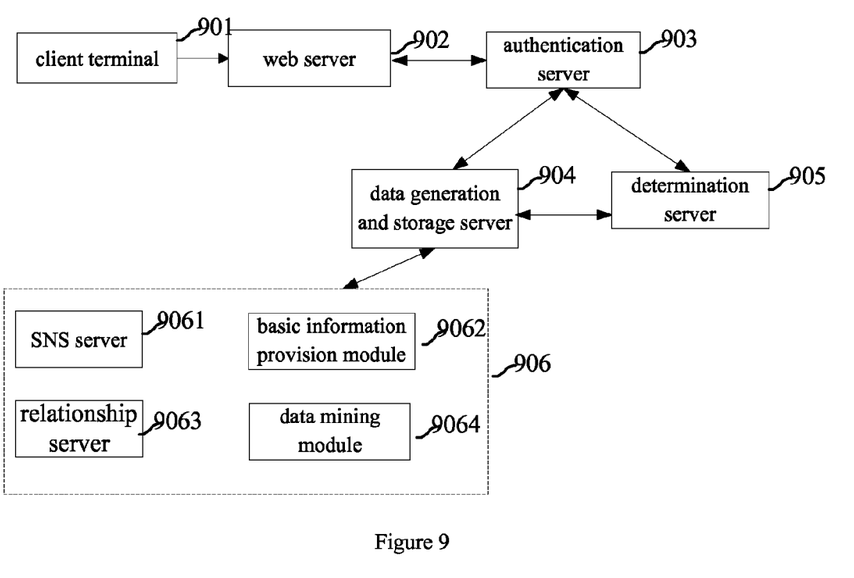
FIG. 9 is an exemplary schematic diagram for a system for authenticating a user in accordance with yet another embodiment of the present invention.

FIG. 9 is an exemplary schematic diagram for a system for authenticating a user in accordance with yet another embodiment of the present invention. As shown in FIG. 9, the system includes a web server 902, an authentication server 903, a data collection and storage server 904, a determination server 905, and a basic information server 906.

The web server 902 is configured to receive an authentication request sent from a user device 901, such as a PC, a Tablet, and a cellphone, and to request questions and answers (authentication information) from the authentication server 903.

The authentication server 903 is configured to process two requests from the web server 902.

First, the authentication server 903 is configured to acquire the type of question and answer (authentication information) from the determination 905 in accordance to the authentication rule, and to receive a question and an answer from the data collection and storage server 904, and send the question and answer to the web server 902. The web server 902 is configured to send the question to user device 901, and to receive feedback information from the user device 901.

Second, the authentication server 903 is configured to verify whether feedback information provided by the user is consistent with the answer, and send the authentication result to the web server 902. The web server 902 is configured to receive the authentication result from the authentication server 903, and to send the authentication result to the user device 901.

The data collection and storage server 904 is configured to collect data related to a user account, such as relationship, contacts, User Generated Content, friends, groups, communities, and social circles, then automatically generate questions and answers (authentication information) in accordance with preset rules for use by the authentication server 903. The data collection and storage server 904 is also configured to mine the user's records of using the social networking service to generate the basic information.

The determination server 905 has two main functions.

First, the determination server 905 stores the authentication rules for generating the questions and answers (authentication information), such as friends recently contacted, pictures recently posted on social networking services, comments recently posted on Weibo, or private nicknames recently given to a friend in QQ, for use by the data collection and storage server 904 either upon request or periodically to generate the questions and answers (authentication information). In another words, the determination server 905 is configured to provide authentication rules when it receives requests related to authentication rules.

Second, the determination server 905 determines the type of security question that the authentication server 903 sends to the user. The types of the security question correspond to the authentication rules, so the determination server 905 determines the authentication rule based on the authentication request. Specifically, the determination server 905 can be configured to select the authentication rule from the set of authentication rules. Alternative, the determination server 905 can also be used generate an authentication information set in accordance with the authentication rule, wherein the authentication information set comprises at least two authentication information items, and the authentication information is randomly selected from the authentication information set.

The basic information server 906 includes an SNS server 9061, a blog server 9062, a relationship server 9063, and a miscellaneous data server 9064, and is configured to store various information related to the user account.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

The various functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for authenticating a user, the method comprising:
    receiving an authentication request sent from a user device by a user, the user device including a memory and a processor coupled to the memory, wherein the authentication request is related to authenticating an account of an instant messaging application;
    collecting, by a social networking service used by the user, the user's recent social networking information that is not shared by the social networking service to other users, including multiple private nicknames given by the user to a plurality of contacts in the instant messaging application hosted by the social networking service;
    mining the user's records of using the social networking service to generate basic information;

obtaining the basic information in response to the authentication request, wherein the basic information includes the multiple private nicknames collected by the social networking service;

generating authentication information based on the basic information, wherein the authentication information comprises a question and a corresponding answer, the question being randomly generated based on the plurality of contacts and where the multiple private nicknames are established to the plurality of contacts by the user, and the corresponding answer being generated based on the multiple private nicknames, wherein the question is related to the user's records of using the social networking service such that the user does not need to set up the question and the answer, and does not need to remember the answer;

sending the question to the user device and receiving feedback information from the user device; and generating an authentication result by verifying whether the feedback information is consistent with the answer, and sending the authentication result to the user device.

2. The method of claim 1, further comprising:
determining an authentication rule in accordance with the authentication request; and
generating authentication information in accordance with the authentication rule.

3. The method of claim 2, further comprising:
providing a set of authentication rules; and
selecting the authentication rule from the set of authentication rules.

4. The method of claim 2, further comprising:
generating an authentication information set in accordance with the authentication rule, wherein the authentication information set comprises at least two authentication information items.

5. The method of claim 1, wherein the answer and the question are related to the user's records of using the social networking service.

6. The method of claim 1, wherein the authentication information comprises at least two options, one option corresponds to the answer, and the step of sending the question to the user device further comprises sending the options to the user device.

7. The method of claim 1, wherein the basic information is not shared by the social networking service to any other user.

8. The method of claim 1, wherein receiving feedback information from the user device comprises receiving feedback information from the user device within a preset time period.

9. An apparatus for authenticating a user, comprising: a memory; and at least one hardware processor coupled to the memory, wherein the at least one hardware processor is configured to execute:
a transmission module configured to receive an authentication request sent from a user device by a user;
a data mining module configured to collect the user's recent social networking information that is not shared by a social networking service to other users; and mine the user's records of using the social networking service to generate basic information;

a basic information provision module configured to obtain the basic information in response to the authentication request, wherein the basic information includes the multiple private nicknames collected by the social networking service;

an authentication information generation module configured to generate authentication information based on the basic information, wherein the authentication request is related to authenticating an account of an instant messaging application; and the authentication information comprises a question and a corresponding answer, the question being randomly generated based on the plurality of contacts and where the multiple private nicknames are established to the plurality of contacts by the user, and the corresponding answer being generated based on the multiple private nicknames, wherein the question is related to the user's records of using the social networking service such that the user does not need to set up the question and the answer, and does not need to remember the answer; and an authentication module configured to generate an authentication result by verifying whether feedback information is consistent with the answer, wherein the transmission module is configured to receive the feedback information from the user device and send the authentication result to the user device.

10. The apparatus of claim 9, wherein the at least one hardware processor is further configured to execute:
an authentication rule determination module configured to determine an authentication rule in accordance with the authentication request; wherein
the authentication information generation module is further configured to generate authentication information in accordance with the authentication rule.

11. The apparatus of claim 10, wherein the at least one hardware processor is further configured to execute:
a storage module configured to provide a set of authentication rules; wherein
the authentication rule determination module is further configured to select the authentication rule from the set of authentication rules.

12. The apparatus of claim 10, wherein authentication information generation module is further configured to generate an authentication information set in accordance with the authentication rule, wherein the authentication information set comprises at least two authentication information items, and the apparatus further comprises a random selection module configured to randomly select the authentication information from the authentication information set.

13. The apparatus of claim 9, wherein the answer and the question are related to the user's records of using the social networking service.

14. The apparatus of claim 9, wherein the authentication information comprises at least two options, one option corresponds to the answer, and the transmission module is further configured to send the options to the user device.

15. The apparatus of claim 9, wherein the basic information is not shared by the social networking service to any other user.

16. The apparatus of claim 9, wherein the transmission module is further configured to receive feedback information from the user device within a preset time period.

* * * * *